May 1, 1962  A. B. WILSON ET AL  3,031,671
SPRING CLIP FASTENER AND METHOD OF FORMING SAME
Filed Dec. 5, 1956  2 Sheets-Sheet 2
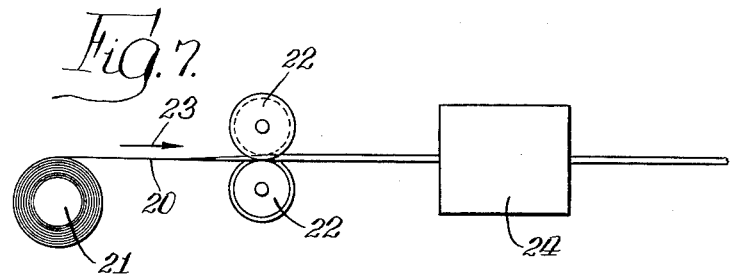
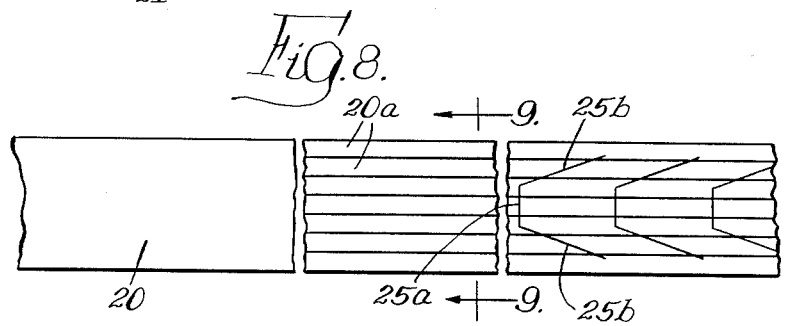
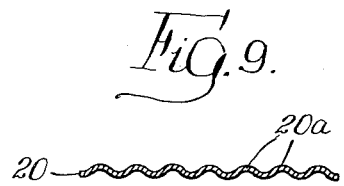
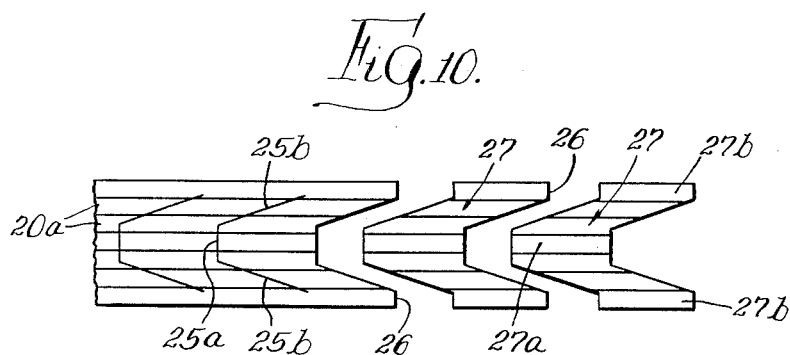
INVENTORS.
Allen B. Wilson,
BY Hugh D. Connell,
Smith, Olsen, Braid & Miller,
Attys.

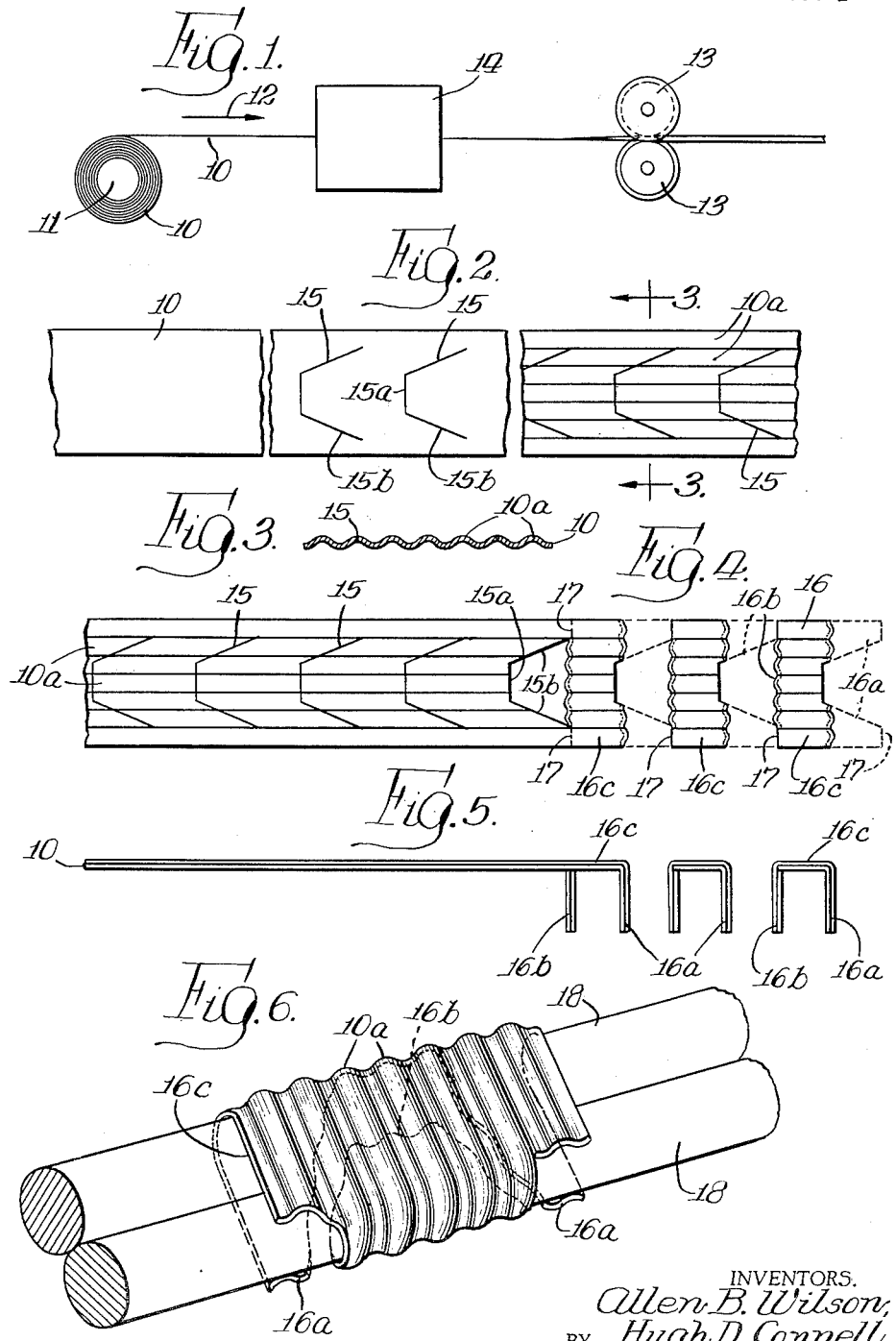

United States Patent Office 3,031,671
Patented May 1, 1962

3,031,671
SPRING CLIP FASTENER AND METHOD OF FORMING SAME
Allen B. Wilson, Chicago, and Hugh D. Connell, Palos Park, Ill., assignors to Acme Steel Company, Chicago, Ill., a corporation of Illinois
Filed Dec. 5, 1956, Ser. No. 626,452
5 Claims. (Cl. 1—66)

This invention relates to improvements in spring clip fasteners adapted for use in securing together adjacent parts of metal springs or other closely spaced or contacting members.

In the upholstery industry, for example, it has heretofore been the practice to secure together certain adjacent parts or convolutions of steel springs by wrapping one or more metal fasteners around them. These metal fasteners or clips have heretofore had the disadvantage that they could not be readily manufactured or stored for use and that they tended to unfold after being placed about the spring parts so that they did not securely hold together the parts intended to be secured thereby.

The principal object of the present invention is to provide an improved metal clip or fastener which may be wrapped around parts of steel springs or other members and which will retain themselves securely in place. A further object of the invention is to provide an improved method of forming spring clip fasteners in a continuous process whereby a series of clips are connected together and formed so that they may be readily cut off or broken off for use. Another object of the invention is to provide a longitudinal strip of connected spring clip fasteners which are partially formed for engagement with the objects to be secured together and which may be severed from the strip after being applied to said objects. Still another object is to provide a longitudinally corrugated metal strip which may be wound in a coil and which is transversely cut or lanced at intervals to provide individual clips which may be readily cut off or separated for use. Other objects of the invention relate to details of the method and to features of the improved clip which will appear more fully hereinafter.

The nature of the invention will be understood from the following specification taken with the accompanying drawings, in which two embodiments of a metal fastener strip constructed according to the present invention and two examples of the improved method of forming the fastener are illustrated. In the drawings, FIGURE 1 shows a somewhat diagrammatic side elevation of apparatus which may be used in unwrapping a strip of steel from a coil, then slitting or lancing it and then corrugating the strip longitudinally, thereby forming a connected series of clips embodying the present invention;

FIG. 2 shows an enlarged top plan view of a metal strip passing through the stages of the method which is carried out by the apparatus shown in FIG. 1, parts of the strip being cut away;

FIG. 3 shows an enlarged transverse section taken on the line 3—3 of FIG. 2;

FIG. 4 shows a top plan view of a metal strip which has been slitted and corrugated according to the present invention with parts thereof bent downwardly to provide flanges adapted to be wrapped around objects to be secured together;

FIG. 5 shows a side elevation of the metal strip and the separated metal clips shown in FIG. 4;

FIG. 6 shows a perspective view on an enlarged scale of one of the separated metal clips shown in FIGS. 4 and 5 after it has been wrapped around two rods which may be the parts of a metal spring to be secured together;

FIG. 7 shows a somewhat diagrammatic side elevation of a modified arrangement of the apparatus illustrated in FIG. 1, whereby the metal strip is corrugated longitudinally in advance of the slitting or lancing operation;

FIG. 8 shows an enlarged top plan view of a metal strip passing through the stages of the method carried out by the apparatus shown in FIG. 7, portions of the strip being cut away;

FIG. 9 shows an enlarged transverse section taken on the line 9—9 of FIG. 8; and FIG. 10 shows an enlarged top plan view of a metal strip passing through the stages of the method which is carried out by the apparatus shown in FIG. 7, illustrating two clips which have been severed for use.

As illustrated in the drawings, a length of strip steel 10, which should preferably be somewhat ductile so that it will retain itself in the position to which it is bent, is wound on a reel 11 from which it is withdrawn in the direction of the arrow 12 by means of two corrugated rolls 13 which pull the strip through slitting apparatus shown diagrammatically at 14. The rolls 13 are power driven and intermesh with each other so that they impart a series of parallel longitudinal corrugations 10a to the metal strip. Before the corrugation takes place, the metal strip passes through the slitting apparatus wherein a series of knives operate to shear or lance the strip along lines 15 which are generally U-shaped, each including a transverse cut 15a and two outwardly diverging cuts 15b. These cuts 15b terminate short of the outer edges of the metal strip and the transverse cut 15a of one set of cuts is spaced endwise from the outer ends of the cuts 15b of the next adjacent set of cuts, as shown in the right-hand position of FIG. 2. This longitudinally corrugated and slitted strip may then be wound in the form of a coil and stored for use. For some purposes the lanced or slitted metal strip may be wound in a coil for use without being longitudinally corrugated.

When it is desired to use a spring clip for fastening together the parts of a spring or the like the end portion of the strip is pulled from the coil and the projecting flange portions 16a, shown by dotted lines in FIG. 4, which have been formed by a previous shearing along the lines 17 and by previous slits 15a and 15b, are bent downwardly at right angles to the plane of the strip to form legs, as illustrated in FIGS. 4 and 5. At the same time, the next adjacent neck portion 16b formed by the slits 15a and 15b is bent downwardly from the dotted line position shown in FIG. 4 to the position shown by full lines in FIGS. 4 and 5, thus forming a neck which is parallel to and spaced from the legs 16a. The complete spring clip 16 thus comprises a central body portion 16c and the attached leg portions 16a and neck portion 16b, all of which are longitudinally corrugated. The clip or fastener thus formed is still attached to the strip and it is preferably allowed to remain in that condition until it has been applied to the spring rods or other objects to be secured together thereby, when it is severed from the strip by shearing along the transverse lines 17 where the body portion 16c of the clip is connected to the next adjacent clip 16.

The fastener 16 may then be wrapped around the parts to be secured together such as the two rods 18 shown in FIG. 6 which may be adjacent convolutions of a steel spring. The fastener is bent around the rods 18 in the manner shown in FIG. 6 where the body portion 16c of the clip is illustrated as lying upon the upper sides of the rods 18 and in contact therewith while the neck portion 16b is bent downwardly at one side of one of the rods 18 and then transversely beneath both of the rods. The legs 16a are bent downwardly at the other side of the assembled rods and they are then bent forwardly beneath the rods and in contact with the under sides thereof, substantially parallel to the neck portion 16b. The two rods are then securely held together and any tendency of the parts of the clip or fastener to unwrap from the rods 18 is effectually resisted by the corrugations which are formed longitudinally in the strip and which then extend transversely to the axes of the rods. The clip 16 may, of course, be separated from the strip before it is wrapped around the rods but it is preferably left attached to the strip until the wrapping operation is completed so that the strip may serve as a handle for the clip which is cut off along line 17 when the clip has been fully applied. By the use of the features of the present invention it is possible to form the spring clips of metal which is thinner than that which has previously been used in forming spring clips and the parts 18 secured thereby are more securely held than has been possible heretofore.

In FIGS. 7, 8, 9 and 10 of the drawings there is illustrated a modification of the invention according to which the long steel strip is corrugated longitudinally before being lanced or slitted and in which the clip or fastener is preferably separated from the formed strip before being applied to the spring rods or other objects to be secured together. The apparatus shown in FIG. 7 illustrates the steel strip 20 as being withdrawn from a reel 21 by means of power driven corrugating rolls 22 which move the strip in the direction of the arrow 23. After longitudinal corrugations 20a have been imparted to the strip by the rolls 22, it moves through a slitting or lancing apparatus which is illustrated diagrammatically at 24. This apparatus comprises shearing knives or blades which lance or slit the corrugated strip along lines of substantial U-shape comprising transverse slits 25a and outwardly diverging slits 25b which terminate short of the lateral edges of the corrugated strip, whereby the strip is separated by the slits into a series of connected spring clip bodies which are adapted to be severed from each other and applied to the spring rods or other objects to be secured. The clip bodies are separated from each other by slitting the edge portions of the strip along the transverse lines 26, thus separating a clip 27 which has a projecting neck 27a formed by the slits 25a and 25b and two longitudinally extending legs 27b which are portions of the metal strip on opposite sides of the neck portion of the next adjacent clip. The spring clips may be separated from the slitted and corrugated metal strip by withdrawing it from a coil in which it may have been wound during the slitting operation and severing the clips successively as the unwinding operation proceeds. The clips thus formed may be packed and shipped in packages and may be conveniently applied by means of suitable tools in the manner previously described in connection with the clip which is shown in FIG. 6.

While one form of the improved clip or fastener and two methods of forming it have been illustrated and described, it will be understood that the clip may take other forms and that the method may be practiced in various ways without departing from the scope of the appended claims.

We claim:
1. The method of forming and applying a metal clip fastener which comprises the steps of running a thin metal strip endwise, lancing the strip transversely to form a series of connected partially formed clip fasteners each having a body portion and flanges extending longitudinally therefrom, bending said flanges transversely to said body portion, then wrapping the flanges of one body portion about objects to be secured together, and then severing said last named body portion from flanges of the next adjacent body portion.

2. The method of forming and applying a metal clip fastener which comprises the steps of running a thin metal strip endwise, lancing the strip transversely and corrugating the strip longitudinally to form a series of partially formed clip fasteners connected at their edges, wrapping portions of the endmost clip fastener in the strip about objects to be secured together, and then severing said endmost clip fastener from the strip.

3. The method of forming and applying a metal clip fastener which comprises the steps of running a thin metal strip endwise, lancing the strip transversely and corrugating the strip longitudinally to form a series of partially formed clip fasteners connected at their edges, each of said partially formed clip fasteners comprising a body portion and longitudinally extending flanges, bending said flanges of the endmost clip fastener in the strip transversely to the body portion thereof, then bending said last named flanges about the objects to be secured together, and then severing said last named body portion from flanges of the next adjacent clip fastener.

4. The method of forming a metal clip fastener which comprises the steps of running a thin metal strip endwise and lancing the strip transversely by U-shaped cuts to form a series of partially formed clip fasteners connected at the edges of the strip, each of said clip fasteners comprising a body with a longitudinal neck extending from one side thereof and two legs extending longitudinally from the other side thereof, bending the neck and the legs of the endmost clip fastener of the series about objects to be secured together, and then severing the legs of said endmost clip fastener from the next adjacent clip fastener.

5. The method of forming a metal clip fastener which comprises the steps of running a thin metal strip endwise and lancing the strip tranversely by U-shaped cuts to form a series of clip fasteners connected at the edges of the strip, each of said clip fasteners comprising a body with a longitudinal neck extending from one side thereof and two legs extending longitudinally from the other side thereof, and then bending the neck and the legs of the endmost clip fastener transversely to the plane of the strip.

References Cited in the file of this patent
UNITED STATES PATENTS

| | | |
|---|---|---|
| 528,569 | Starr | Nov. 6, 1894 |
| 2,082,577 | Herschmann | June 1, 1937 |
| 2,383,135 | Lang | Aug. 21, 1945 |
| 2,417,423 | Lang | Mar. 18, 1947 |
| 2,506,519 | Rollins | May 2, 1950 |